Jan. 11, 1944.    A. R. GROSS    2,338,934
AUTOMATIC TOW BAR FOR AUTOMOTIVE VEHICLES
Filed Jan. 15, 1942    2 Sheets-Sheet 1
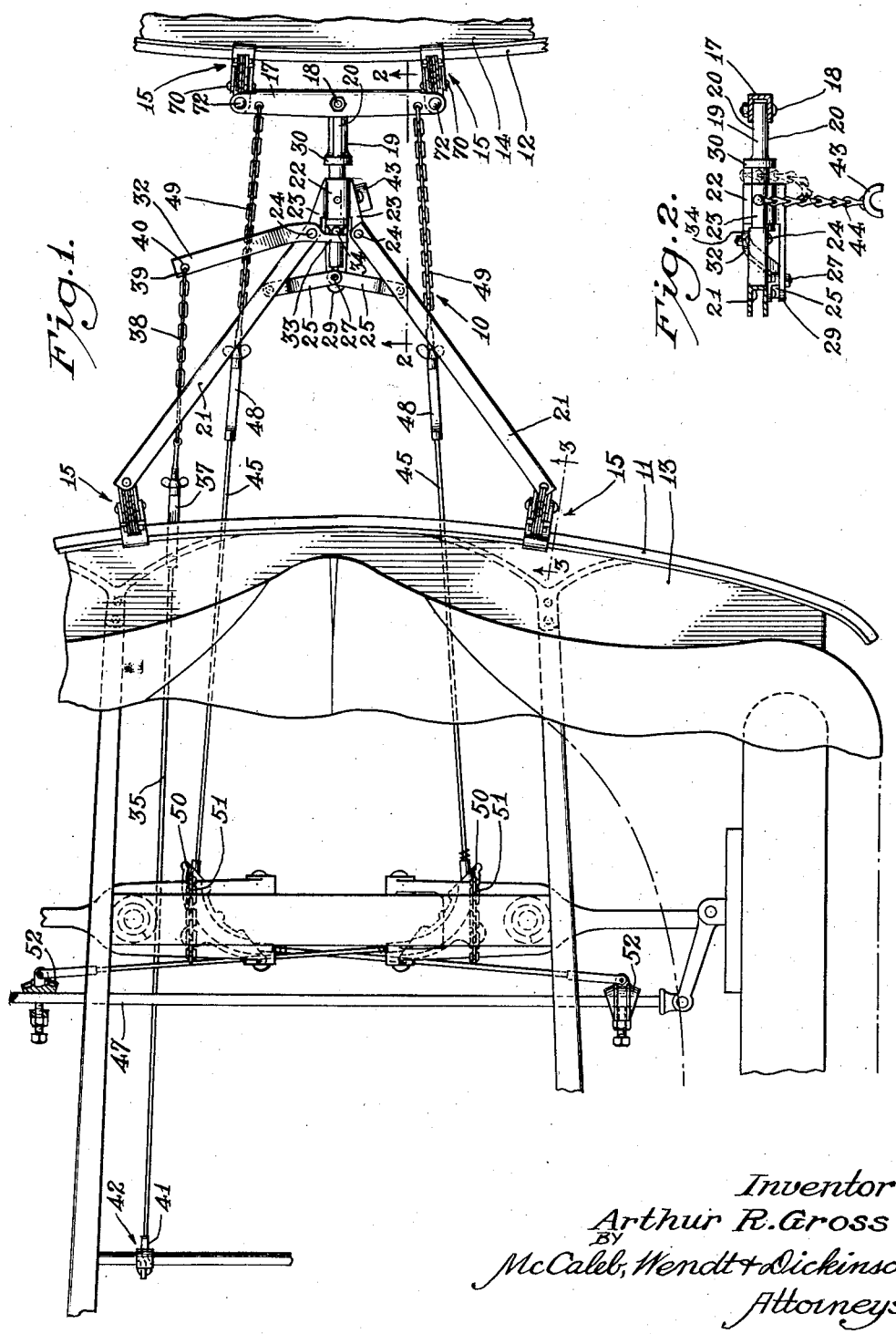
Inventor
Arthur R. Gross
BY
McCaleb, Wendt & Dickinson
Attorneys.

Jan. 11, 1944.   A. R. GROSS   2,338,934
AUTOMATIC TOW BAR FOR AUTOMOTIVE VEHICLES
Filed Jan. 15, 1942   2 Sheets-Sheet 2
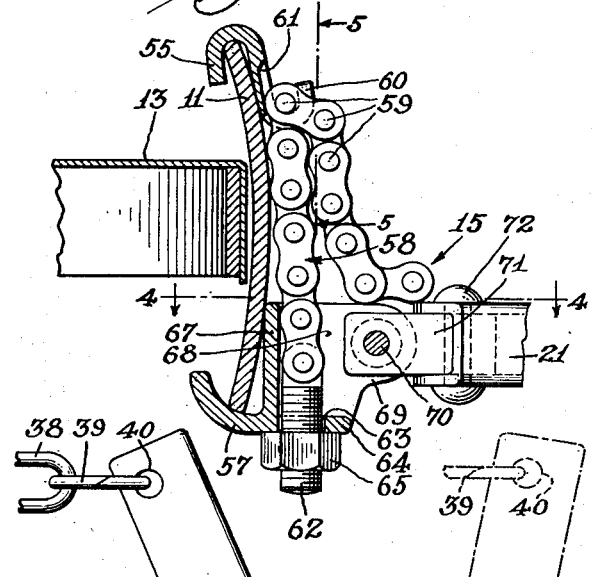
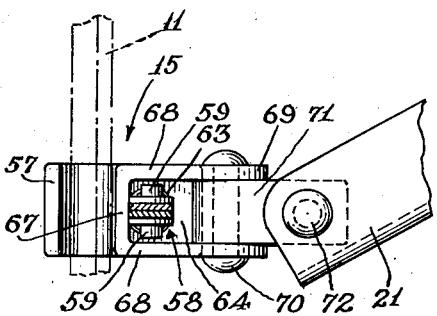
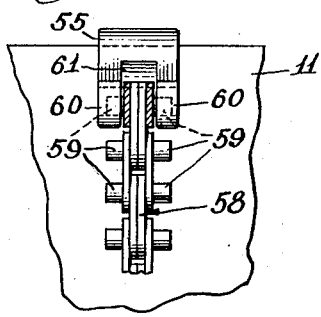
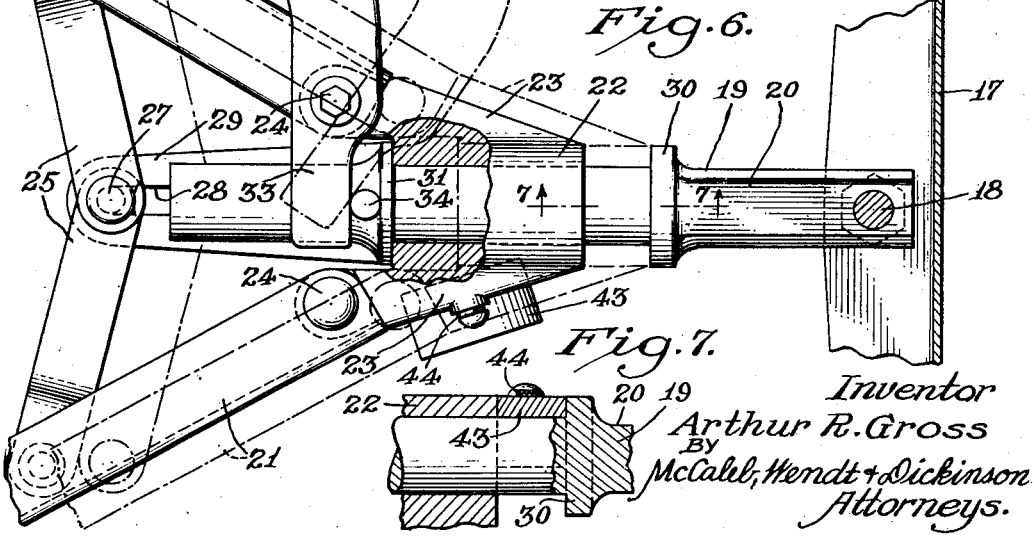
Inventor
Arthur R. Gross
By
McCaleb, Wendt & Dickinson
Attorneys.

Patented Jan. 11, 1944

2,338,934

UNITED STATES PATENT OFFICE 2,338,934

AUTOMATIC TOW BAR FOR AUTOMOTIVE VEHICLES

Arthur R. Gross, St. Paul, Minn., assignor of thirty-five per cent to C. S. Hagan, Duluth, thirty-five per cent to J. P. Snyder, Minneapolis, and thirty per cent to Ira E. Meagher, Minneapolis, Minn.

Application January 15, 1942, Serial No. 426,874

7 Claims. (Cl. 188—142)

This invention relates to improvements in tow bars of the type which are particularly suitable for connecting together a pair of motor vehicles such as passenger automobiles, one of which is to be towed driverless by the other vehicle.

One of the objects of my invention is to provide a tow bar structure of this type which is equipped for automatically steering and braking the towed vehicle, which is readily adaptable for effective connection to automobile bumpers of a wide variety of different styles, and which is of relatively simple and inexpensive construction and may be easily and quickly installed.

Another object of my invention is to provide an improved bumper clamp structure for the tow bar, and in particular such a structure which is eminently suited for use with bumpers that have splash plates or other obstructions at their inner faces preventing the placement of vertical anchoring bars therealong and must therefore be engaged at their top and bottom edges.

Another object is to provide the tow bar with bumper clamps that are of a novel thorough gripping, but flexible and adjustable construction for high adaptability to various conditions that may be encountered in the bumpers to which they must be attached.

Another object of the invention is to provide the tow bar with improved automatic braking mechanism.

A further object is to provide a tow bar of this general type which is arranged to be free from twisting strains when one of the vehicles tilts relative to the other.

Other objects and advantages of the invention will be apparent from the following description and the accompanying drawings, in which similar characters of reference indicate similar parts throughout the several views.

Referring to the drawings:

Fig. 1 is a top plan view of my novel tow bar, showing the same, more or less schematically coupling a pair of vehicles;

Fig. 2 is a fragmentary side elevational view taken substantially along lines 2—2 of Fig. 1;

Fig. 3 is a fragmentary, enlarged sectional elevational view taken substantially along line 3—3 of Fig. 1 and showing details of construction of one of the bumper clamps;

Fig. 4 is a horizontal sectional view through the clamp taken in substantially the plane of line 4—4 of Fig. 3;

Fig. 5 is a fragmentary rear elevational view partially in section, taken substantially along line 5—5 of Fig. 3 and showing the rear of the upper jaw of the clamp;

Fig. 6 is an enlarged fragmentary top plan view, partially broken away and in section showing details of the automatic braking mechanism;

Fig. 7 is a vertical sectional detail view taken substantially along line 7—7 of Fig. 6 but showing the brake lock in position.

Having particular reference to the drawings, wherein is shown a preferred embodiment of my invention, a tow bar 10 (Fig. 1) is connected to the front bumper 11 of a vehicle to be towed and to the rear bumper 12 of the towing vehicle. The bumpers 11 and 12 are of the currently popular style wherein horizontal splash plates 13 and 14, respectively, extend between the inner faces of the bumpers and the bodies of the vehicles.

The tow bar 10 is constructed to be collapsed into a convenient relatively small elongated bundle when not in use, and is arranged to be quickly spread open from the collapsed condition and easily secured in towing position. At its front and rear ends the tow bar has pairs of identical bumper clamps generally identified by the numeral 15, the details of which will be elaborated upon hereinafter.

The front bumper clamps 15 are carried by the respective opposite ends of a horizontal single-tree crossbar 17 and are secured to the rear bumper 12 at spaced points equidistant from the longitudinal center of the bumper. The crossbar 17 is preferably of rearwardly opening, channel shape construction (Fig. 2) and is pivotally secured at its longitudinal center as by means of a bolt 18 to the forward end of a rearwardly extending pull bar 19 which has flat upper and lower bearing faces 20 slidably engageable with the opposing faces of the crossbar flanges.

The rear pair of bumper clamps 15 are spread substantially further apart than the front clamps and engage the front bumper 11 at points equidistantly spaced from its longitudinal center. Each of the rear clamps 15 is pivotally mounted at one end of a preferably channel shaped arm 21 which serves to connect such clamp to the pull bar 19 through the medium of a coupling sleeve 22.

At each side of the coupling sleeve 22 is an identical horizontally extending fin or ear 23 which is of rearwardly flaring shape and fits slidably within the adjacent end of the associated connecting arm 21. Each of the arms 21 is pivotally secured to its ear 23 by such means as a headed pin or bolt 24.

Equalized spreading of the connecting arms 21 is assured by toggle links 25 which are pivotally secured at their outer ends to the lower faces of the respective arms at points spaced rearwardly a limited distance from the ears 23. At their inner ends, the links 25 are pivotally secured together by a headed pin or bolt 27, the shank of which is slidably received within a longitudinal guide slot 28 provided in a rearwardly extending centering bar 29 rigidly integral with the lower face portion of the coupling sleeve 22. Through this arrangement it will be seen that when the tow bar unit is not in use, the arms 21 may be collapsed together into substantially parallel relation and that they may be spread apart to varying extents as required (but preferably to full extent) for proper adjusted attachment of the rear clamps 15 to the bumper 11, each of the arms being controlled by the equalizing links 25 to spread equally relative to the axis of the pull bar 19. Furthermore, the equalizing links 25 function during towing to resist tendency toward collapsing together or spreading of the arms 21 under influence of the pulling or pushing forces to which the tow bar is subjected.

According to the present invention, limited relative axial movement between the pull bar 19 and the coupling sleeve 22 is utilized for operating an automatic braking mechanism for the towed vehicle. To this end, the coupling sleeve 22 engages a cylindrical section of the pull bar 19 slidably for both rotatable and longitudinal relative movement. The relative longitudinal movement is limited to a predetermined range between front and rear integral stop collars 30 and 31 on the pull bar. Thus, while a towing pull is being exerted, the rear end of the coupling sleeve 22 solidly engages the rear stop collar 31 but when there is a let-up in the pull, any momentum of the towed vehicle tending to cause it to overtake the towing vehicle, will cause the coupling sleeve 22 to slide forwardly until its forward end engages the forward collar 30.

An an incident to such forward movement of the coupling sleeve 22, a brake lever 32 is actuated to apply the brake of the towed vehicle. The brake lever 32 comprises a rigid metal bar which is mounted on and extends substantially beyond and slightly downwardly from the left side of the coupling sleeve 22. It may be pivotally connected for horizontal swinging movement to the top of the left-hand ear 23, preferably by means of the same connecting pin 24 by which the associated connecting arm 21 is secured to the ear. A short finger portion 33 of the brake lever extends into overlying relation to the rear portion of the pull bar 19. This finger 33 is so constructed and related to engage at its forward edge against an upwardly extending stop pin 34 integral with the pull bar that when the coupling sleeve 22 moves forwardly relative to the pull bar, the brake lever 32 will be actuated to swing clockwise (as seen in dot-dash outline in Fig. 6) to carry its longer outer portion forwardly through a substantial arc. This results in a forward pull on a braking cable 35 connected through the medium of a turnbuckle 37 and a chain leader 38 to the brake lever. By preference, the leader 38 has a connecting link 39 which engages in a vertical aperture 40 near the outer end of the brake lever.

The opposite end of the braking cable 35 is provided with a hook 41 which is hooked onto an effective part of the braking mechanism (indicated at 42 in Fig. 1) of the towed vehicle. In connecting up the braking cable 35 with the brake mechanism 42, slack is taken up by turnbuckle 37 to place the cable under tension of the usual release spring arrangement of the brake mechanism and assure quick response to braking movement of the braking lever 32.

At times it may be desired to back up the connected vehicles, and means is therefore provided for locking the pull bar 19 and the coupling sleeve 22 against relative brake applying movement. Herein such means comprises a half-collar 43 (Figs. 2 and 7) which is designed to be placed between the forward edge of the coupling sleeve 22 and the forward collar 30 on the pull bar by dropping the half-collar into place while the space is at its maximum. This effectually holds the coupling sleeve 22 in its rearmost position and assures that the brake will not be applied when the towing vehicle thrusts rearwardly in backing up.

The locking collar 43 may be maintained at all times close to the point of use by means of a fastening chain 44 suitably secured thereto at one end and at its other end to a suitable part of the coupling sleeve 22.

For automatic steering of the towed vehicle, steering cables 45 are connected to the cross bar 17 and to the steering tie rod 47 of the towed vehicle. Each of the steering cables 45 is identically constructed and is secured at its forward end by means of a turnbuckle 48 to a leader chain 49, the aforemost link of which is anchored to the cross bar 17. The left leader chain is secured as close as practicable to the left end of the cross bar and the right leader as close as practicable to the right end of the bar. Underneath the towed vehicle each of the steering cables 45 passes through a slide pulley 50 which is anchored by means of a chain 51 looped around a convenient part of the front wheel supporting undercarriage of the vehicle. The rear extremities of the steering cables are secured by means of removable clamps 52 adjacent to the respective opposite ends of the steering tie rod 47, the right steering cable adjacent to the left end of the tie rod and the left steering cable adjacent to the right end of the tie rod. Thus, when the towing vehicle turns left or right, the cross bar 17, of course, moves likewise and pulls on the right steering cable 45 when turning left and on the left steering cable 45 when turning right, which causes the steering tie rod 47 to be appropriately shifted longitudinally for turning the wheels of the towed vehicle to follow the towing vehicle.

Each of the bumper clamps 15 may be of an identical standardized construction having principal engagement at the upper and lower edges of the associated bumper and operating without the need for any tie bar or connecting member extending along the inside face of the bumper as has been required in prior arrangements. To this end, each of the clamps 15 comprises an upper broad hook-shaped jaw 55 designed to hook over the upper edge of the bumper, and a lower broad hook-shaped jaw 57 designed to hook onto the lower edge of the bumper (Figs. 3, 4 and 5).

The clamp jaws 55 and 57 are connected together adjustably by flexible means such as a suitable chain 58 and are thus adapted to be used with a wide variety of bumper shapes and widths. By preference the chain 58 is of the general type known as vise chain having a series of rugged plate links connected together by pins 59 which have their opposite ends projecting substantially to both opposite sides of the chain whereby to provide two lateral series of coaxially aligned pintles. Such pintles are adapted to be removably engaged selectively by a pair of hook-shaped pintle-engaging flanges 60 bent up along the lower margin of the upper clamp jaw 55 on the opposite side from the bumper hook in such fashion that from the side the jaw member 55 appears substantially S-shaped. The flanges 60 are spaced apart sidewise just far enough to receive the widest portion of the chain linkage therebetween, and the body of the jaw member may be recessed, as at 61, adjacent the space between the flanges to provide adequate clearance for the link head. Through this arrangement any selected one of the pintle pins 59 throughout the length of the chain may be engaged for predetermined spacings of the clamp jaws. Stated another way, the clamp jaws may be incrementally adjusted as to spacing as determined by the uniformly spaced series of pintle pins 59.

Further incremental adjustment of the clamp jaws 55 and 57 relative to one another, and tightening of the jaws onto the bumper is effected by means such as a stud 62 which is connected to the lower end of the chain 58. For this purpose, the stud extends down through an aperture 63 in a horizontally extending abutment plate 64 which is formed integral with the heel of the lower jaw 57 and provides a downwardly facing surface for engagement by a tightening nut 65 threaded onto the stud. Thus, in adjusting the clamp to the bumper the upper jaw 55 is first hooked onto the selected pintle pin 59 at such a distance from the lower jaw 57 as to afford ample clearance to engage the jaws easily onto the respective edges of the bumper, and then the nut 65 is tightened to draw the stud 62 and the chain 58 toward the lower jaw 57 until the jaws grip the bumper firmly.

In order to resist sliding of the jaws 55 and 57 relative to the bumper under the influence of the strong pulling and pushing forces to which the structure is subjected in use, both jaws are preferably formed of substantial widths and the inside or gripping surfaces are designed to confine the bumper edges within reasonably close front-to-rear limits. For this purpose, the upper jaw is formed with only slightly greater clearance between its opposed surfaces than the average bumper thickness. The lower jaw is formed with a rather sharply inwardly slanting lip surface, as seen in Fig. 3, which causes the lower edge of the bumper to seat automatically closely adjacent to the inside face of the jaw when the clamp is tightened in place.

To protect the adjacent face of the bumper against being scratched or marred by the stud 62 or adjoining portions of the chain 58, the back face of the lower jaw 57 may be formed as a substantially flat vertically extending guard plate 67.

Extending rearwardly from the opposite sides of the guard plate 67 are spaced parallel reinforcing plates 68 integrally connecting the plate 67 and the bumper plate 64. The reinforcing plate 68 serves in addition as means for connecting the jaw structure in place on the tow bar. Thus, each of the plates 68 has an ear 69 apertured to receive a horizontal connecting pin 70 by which an elongated knuckle block 71 is pivotally secured adjacent one end between the ears. Adjacent to its opposite end, the knuckle block 71 is connected by means of a connecting pin 72 to the associated end of the cross bar 17 or of the respective connecting arm 21, as the case may be, for swinging movement about a vertical axis. Through this arrangement, each of the bumper clamps 15 is pivotally adjustable about both horizontal and vertical axes relative to the tow bar in order to conform to various bumper shapes and arrangements.

When the tow bar 10 is not being used, it may readily be collapsed into a relatively small elongated bundle in which the several pivoted parts are swung to extend generally in a longitudinal direction. In this collapsed condition, the upper clamp jaw members 55 may be secured against loss by engaging them with the pintle pins 59 nearest the upper edges of the side plates 68 of the associated lower jaw members, and then tightening the adjusting stud nut 65 until the chain draws the engagement flanges 60 tight against the adjacent structure of the lower jaw member. The jaw members are thus locked together against accidental separation.

It may be noted that the tow bar 10 is entirely free from danger of twisting strains when one of the vehicles tilts sidewise relative to the other. This results from having the pull bar 19 and the slidable coupling sleeve 22 freely relatively rotatable. Therefore, the front clamp section and the rear clamp section of the tow bar can move tiltably with the respective associated vehicles and in this respect independently of each other. Moreover, the arrangement of the braking lever 32 and the pin 34 is such as to present no interference to such relative rotary movement, and they will in fact continue to function for effective braking throughout a substantial range of the rotary movement. For this the lever finger 33 is of a length to have its forward engagement face normally extending substantially to opposite sides of the pin 34, sufficiently to maintain contact with the latter throughout said limited range of rotary movement.

From the foregoing it will be apparent that my invention provides a highly adaptable and efficient tow bar which has an improved arrangement of clamping and automatic steering and braking features. This tow bar is free from the danger of distortions due to tilting of the coupled vehicles. The novel, widely adjustable, thorough gripping bumper clamps are particularly suitable for securing the tow bar to automotive vehicles having splash plates or other obstructions which prevent the passage of clamp structure adjacent the inside faces of the bumpers. My improved tow bar can be constructed of relatively light weight materials without sacrifice in the over-all strength necessary to withstand the hard usage to which such an apparatus is put.

While I have illustrated and described a preferred embodiment of my invention, many modifications may be made without departing from the spirit of the invention, and I do not wish to be limited to the precise details of construction as set forth, but desire to avail myself of all changes within the scope of the appended claims.

Having thus described my invention, what I claim as new and desire to secure by Letters Patent of the United States is:

1. A tow bar for automotive vehicles comprising, in combination, a crossbar having means for removably securing it to the rear bumper of a towing vehicle, a pull bar connected at its forward end to said crossbar, a pair of divergent frame bars adapted to be secured at their divergent ends to the front bumper of a towed vehicle, a coupling sleeve slidably engaging said pull bar and having the converging ends of the frame bars secured thereto, means on said pull bar for confining said coupling sleeve to a limited range of relative longitudinal movement, and means for braking the towed vehicle in response to overtaking movement of the towing vehicle and consequent forward longitudinal movement of the coupling sleeve on the pull bar, said braking means including a lever pivotally mounted on said coupling sleeve and having a braking cable extending from its outer end to the brake mechanism of the towed vehicle, the inner end portion of said lever extending transversely alongside the pull bar and being engageable with a fixed part extending from said pull bar so that coincident with said forward movement of the coupling sleeve the lever will be actuated by engagement with said fixed part to pull on said cable and automatically apply the brakes of the towed vehicle.

2. A tow bar as defined in claim 1 in which the crossbar has steering cables connected adjacent to its opposite ends for automatically steering the towed vehicle to follow the towing vehicle in turning.

3. A tow bar as set forth in claim 1, which includes means to be applied between the coupling sleeve and the foremost element of the movement-limiting means on the pull bar for locking the coupling sleeve and pull bar against relative movement when it is desired to avoid application of the brakes of the towed vehicle.

4. In combination in a tow bar for automotive vehicles, front means for securing the tow bar to the rear bumper of a towing vehicle, rear means for securing the tow bar to the front bumper of a vehicle to be towed, mechanism for connecting said front and rear means together including a pull bar and a coupling sleeve rotatably and longitudinally slidable on said pull bar, means on said pull bar for limiting relative longitudinal movement of the pull bar and the coupling sleeve to a predetermined range, an eccentrically pivoted brake lever mounted externally on said coupling sleeve and having its shorter end portion extending across said pull bar adjacent one end of the coupling sleeve, and an actuating member projecting fixedly from said pull bar to engage said shorter end portion of the lever and pivot the lever in response to relative movement of the coupling sleeve and the pull bar in one longitudinal direction for applying the brakes of the towed vehicle.

5. The combination in a tow bar for automotive vehicles, means for removable attachment to the rear bumper of a towing vehicle, a pivoted pull bar extending rearwardly from said means, means for removably engaging the bumper of a vehicle to be towed, a pair of relatively adjustable body frame arms extending from said last mentioned means and converging forwardly toward said pull bar, a coupling member slidably engaging said pull bar and having the forward converging ends of said frame arms pivotally secured thereto, and equalizing means for said frame arms connected to said coupling member.

6. A tow bar as defined in claim 5, in which the equalizing means comprises a rigid element extending rearwardly from the coupling member, and a pair of toggle links respectively secured on fixed pivots to said arms at their outer ends and extending toward and having their inner ends connected in joint longitudinally movable relation to said rigid element.

7. A tow bar for automotive vehicles comprising, in combination, a pull bar, means for removably securing the pull bar to the rear bumper of a towing vehicle, a pair of divergent frame bars having means at their remote ends for securing them to the front bumper of a towed vehicle, a coupling sleeve slidably engaging said pull bar, means on said pull bar for confining said coupling sleeve to a limited range of relative longitudinal movement on the pull bar, laterally extending diametrically opposite members on said coupling sleeve pivotally engageable with the proximate ends of the divergent frame bars, means pivotally connecting said proximate frame bar ends to said lateral members at respectively opposite sides of the coupling sleeve and adapting the frame bars to be adjustably pivoted for increasing or decreasing their angle of divergence as necessitated by variation in the bumper structures of various towed vehicles, and means for braking the towed vehicle in response to overtaking movement of the towing vehicle and resultant forward longitudinal movement of the coupling sleeve on the pull bar, said braking means including a lever and a fixed part extending from said pull bar movable with the pull bar away from the coupling sleeve upon the occurrence of said forward movement of the coupling sleeve, said lever being pivotally mounted by one of said pivotal connecting means and having an end portion extending into the path of said fixed part so that in the forward movement of the coupling sleeve said end portion is swung rearwardly by said fixed part and the opposite end portion of the lever is swung forwardly for applying the brakes of the towed vehicle.

ARTHUR R. GROSS.